Figure 1:
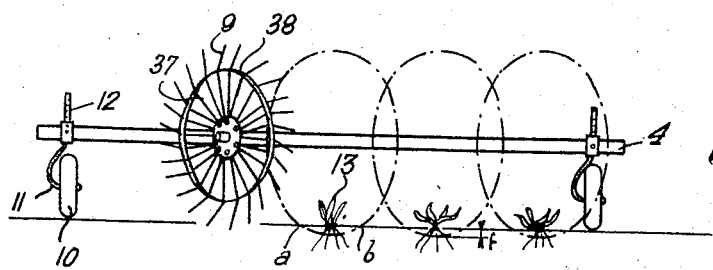

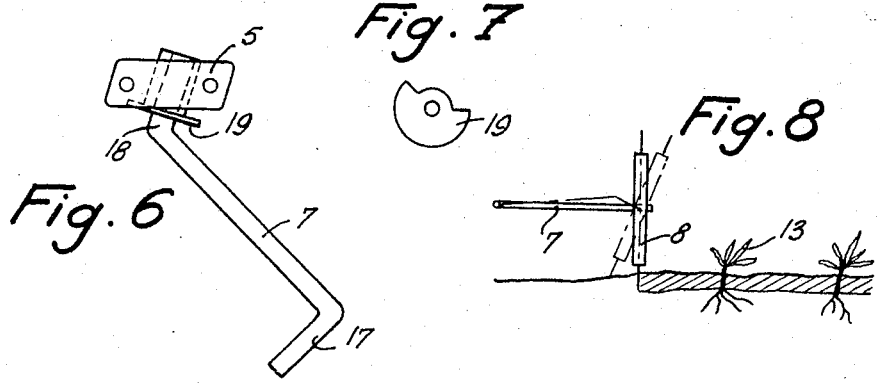
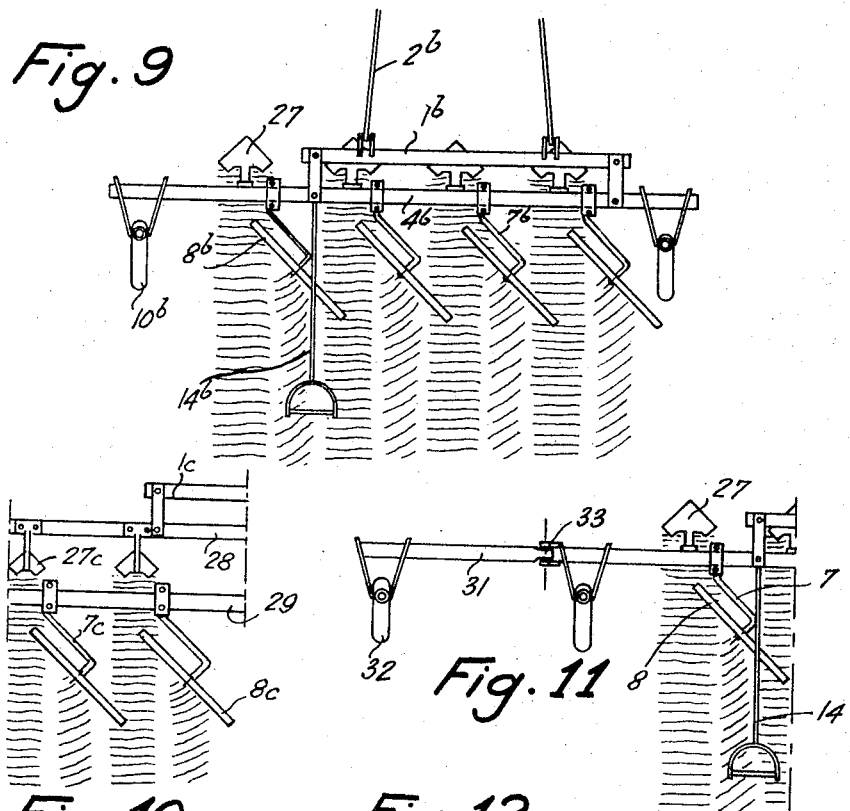

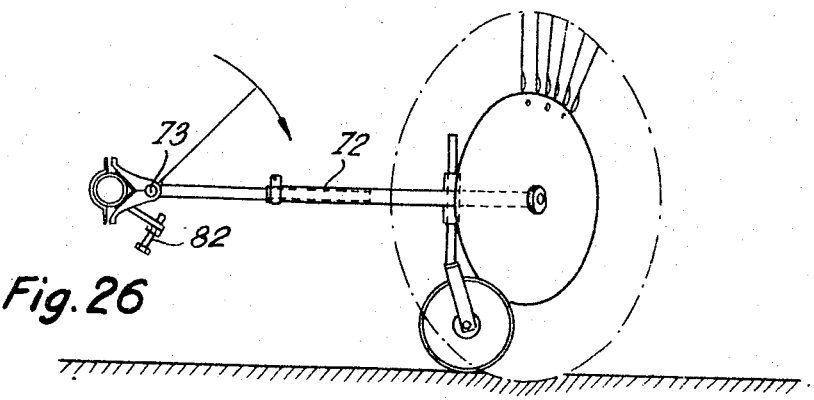
Fig. 26
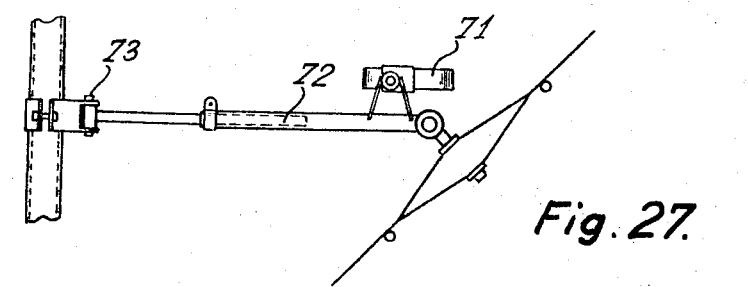
Fig. 27.
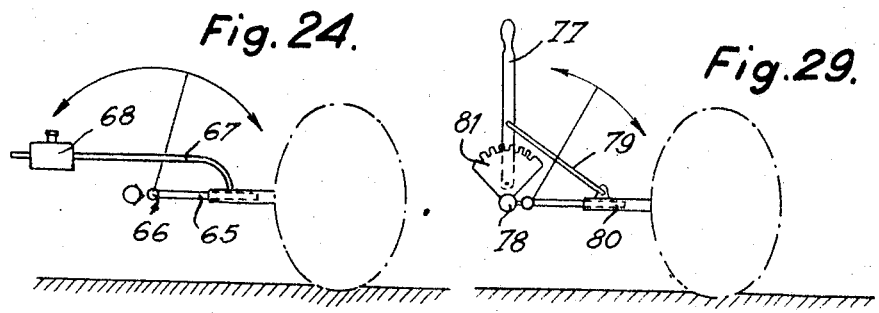
Fig. 24.
Fig. 29.
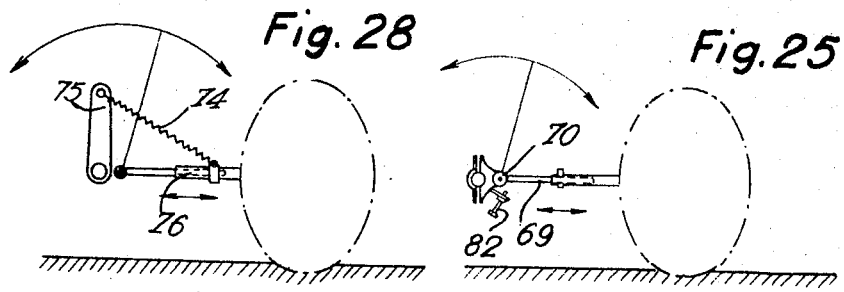
Fig. 28
Fig. 25

April 18, 1967  A. A. L. REMY  3,314,486
AGRICULTURAL IMPLEMENTS
Original Filed April 22, 1955  11 Sheets-Sheet 7

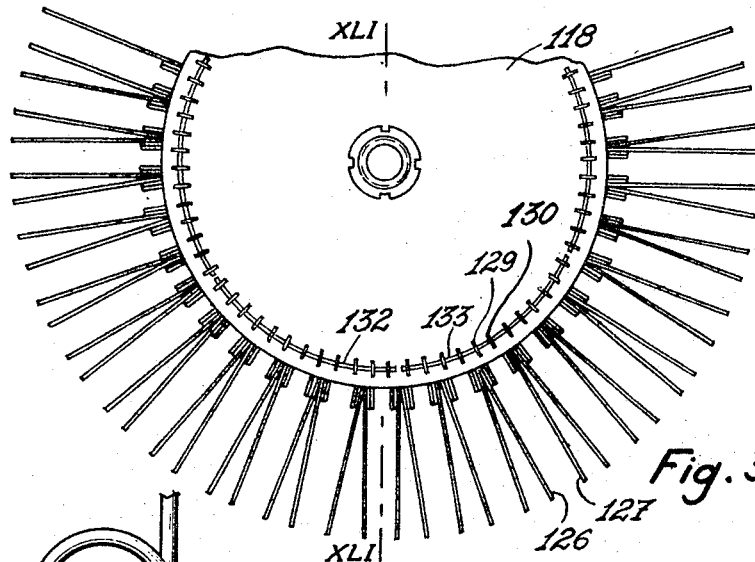
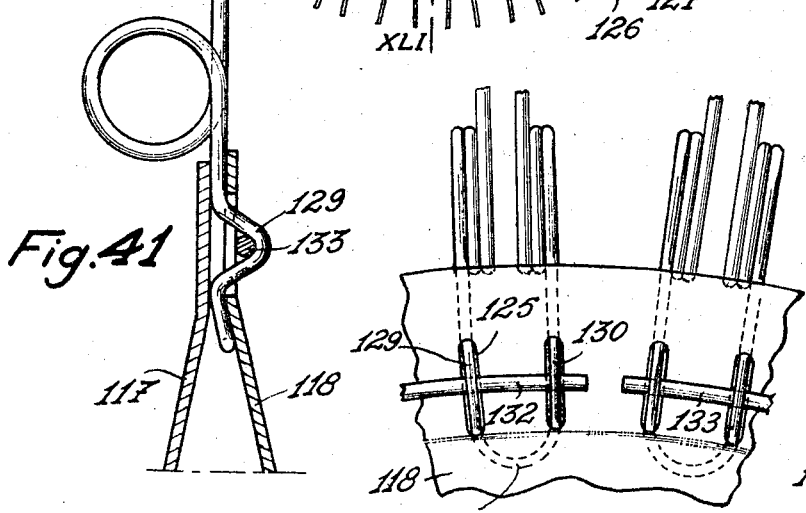
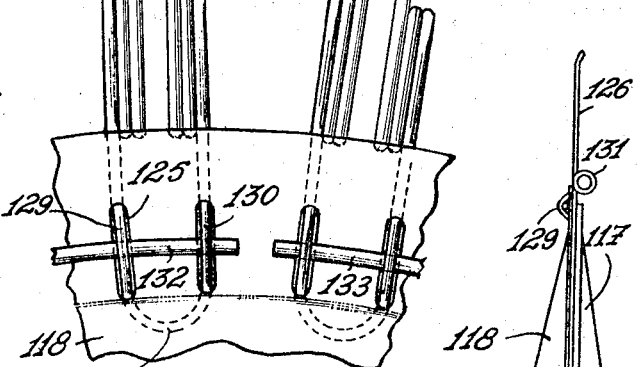
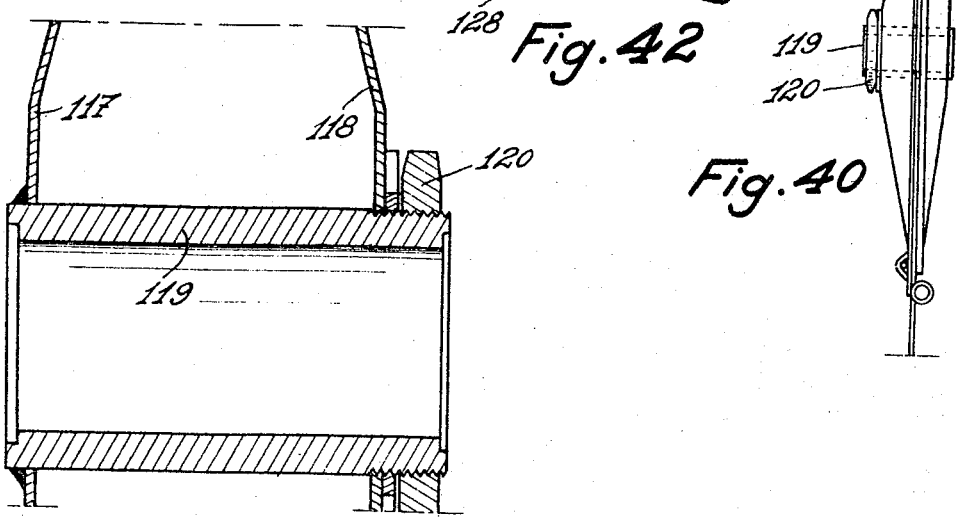

April 18, 1967  A. A. L. REMY  3,314,486
AGRICULTURAL IMPLEMENTS
Original Filed April 22, 1955  11 Sheets-Sheet 9
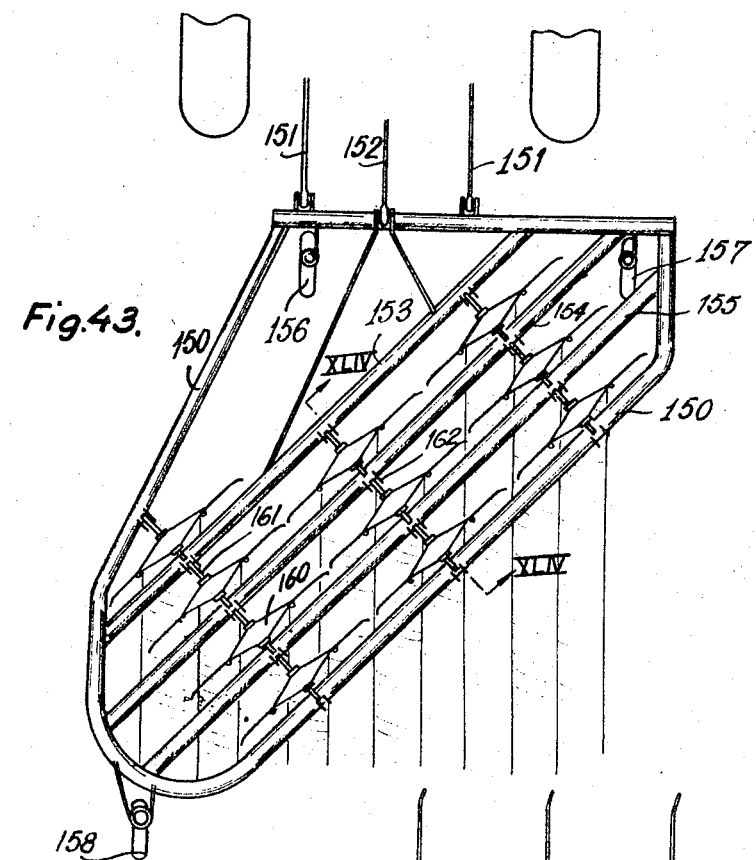
Fig.43.
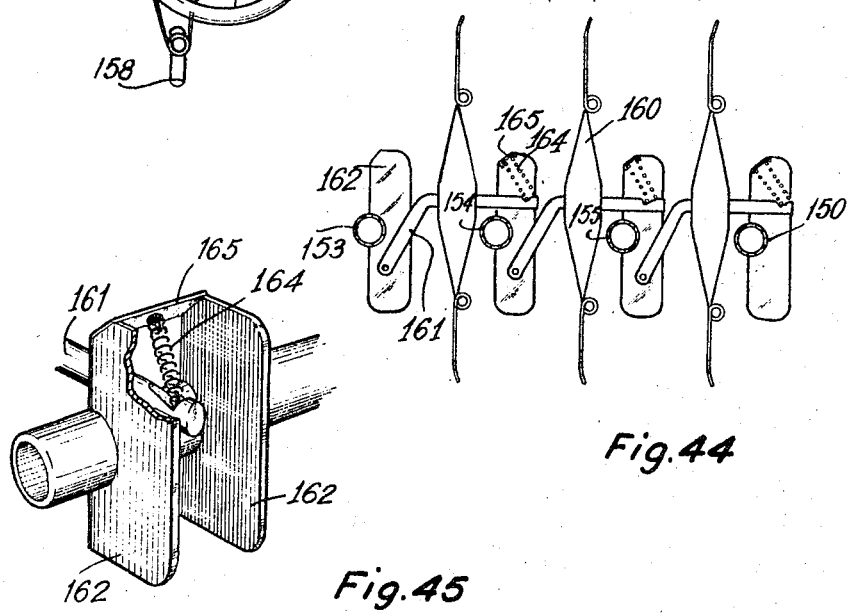
Fig.44
Fig.45

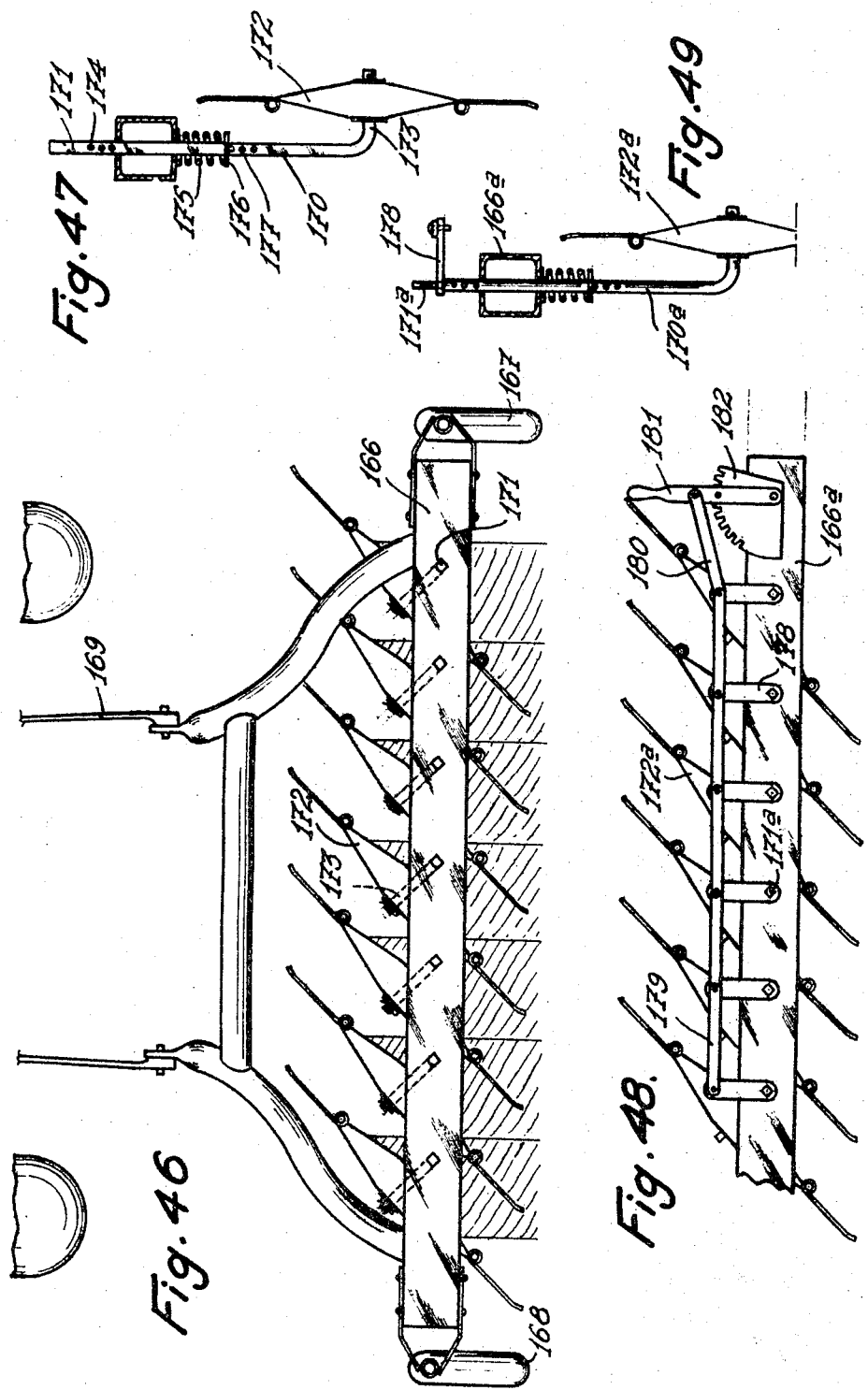

United States Patent Office 3,314,486
Patented Apr. 18, 1967

3,314,486
AGRICULTURAL IMPLEMENTS
Albert Auguste Louis Remy, Senonches, Eure-et-Loir, France, assignor to C. van der Lely N.V., Maasland, Netherlands, a limited-liability company of the Netherlands
Original application Apr. 22, 1955, Ser. No. 503,195, Divided and this application Sept. 12, 1963, Ser. No. 309,373
Claims priority, application France, Apr. 28, 1954, 668,087, Patent 1,104,111
1 Claim. (Cl. 172—543)

The application is a divisional of application Ser. No. 503,195 filed Apr. 22, 1955, now abandoned.

This invention relates to agricultural implements.

It is an object of the invention to provide an improved agricultural implement.

In accordance with the invention there is contemplated the provision of an agricultural device comprising a tractor having a normal forward direction of travel and including ground supporting wheels and on which is arranged in trailing relationship a lifting device to which is affixed a horizontal cross-member.

According to one feature of the invention a telescopic support may be aligned with the aforesaid direction of travel in trailing relationship to the cross-member with means pivotally connecting the telescopic support to the cross-member for free hinged movement about a horizontal axis adjacent the cross-member.

In addition and in accordance with a further feature of the invention, there is contemplated the provision of an adjustable stop operatively associated with the cross-member and the support to limit downward movement of the rider, whereby to limit penetration into the ground, as will be hereinafter seen.

Still further there is provided a generally vertical and free-wheeling tined wheel, there being means supporting the tined wheel for rotation of a horizontal axis and connecting the same to the support for hinged adjustment about a vertical axis whereby to adjust the angle of the tined wheel relative to the direction of travel of the tractor.

In accordance with a further feature of the invention there may be provided a ground engaging wheel coupled to and supporting the support in an adjustable manner.

The tined wheel contemplated in accordance with the preferred embodiment of the invention is also a special feature thereof. This tined wheel may comprise facing discs between which are supported radial tine elements. Each of these tine elements may include a U-shaped portion between the discs, the U-shaped portiton including cranked portions extending through one of the discs and forming loops outside of the same.

In accordance with a further advantageous feature of the invention, a locking element extends through the loops to prevent removal of the tine elements from the discs, there being provided co-axial coils on the U-shaped portions with tines extending outwardly therefrom.

Figure 2:
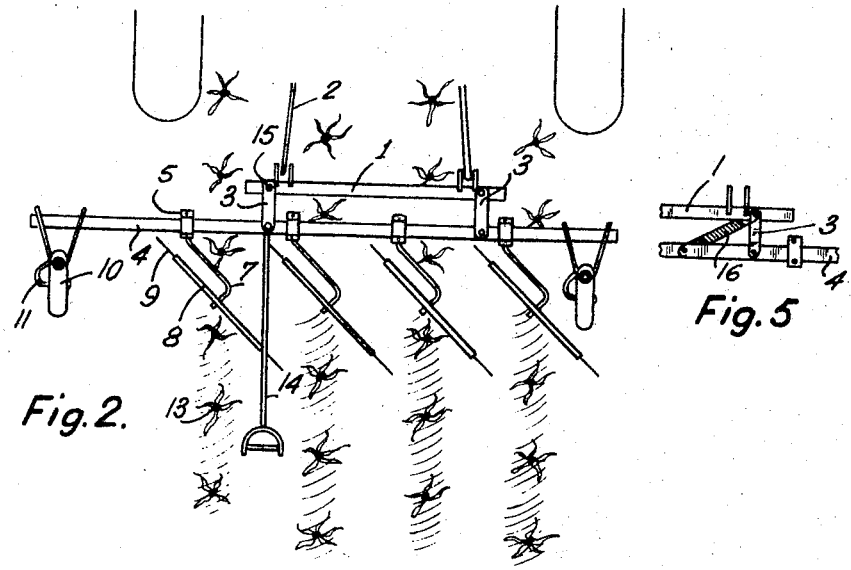
Figure 5:
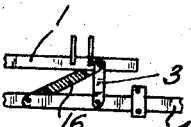
Figure 3:
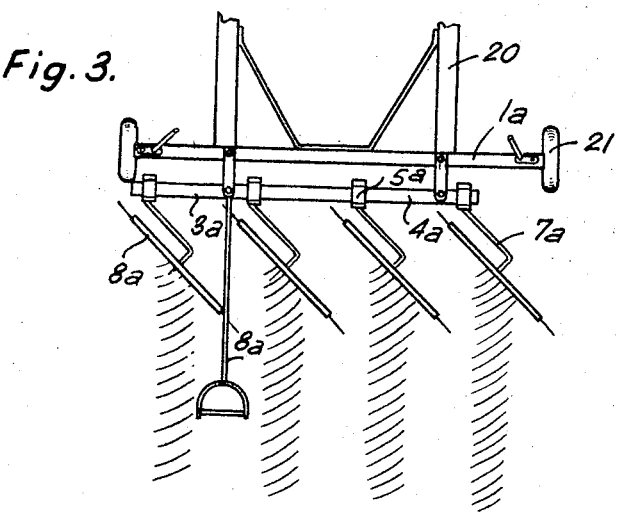
Figure 4:
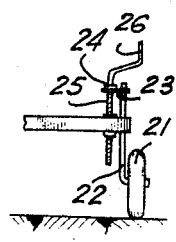
Figure 13:
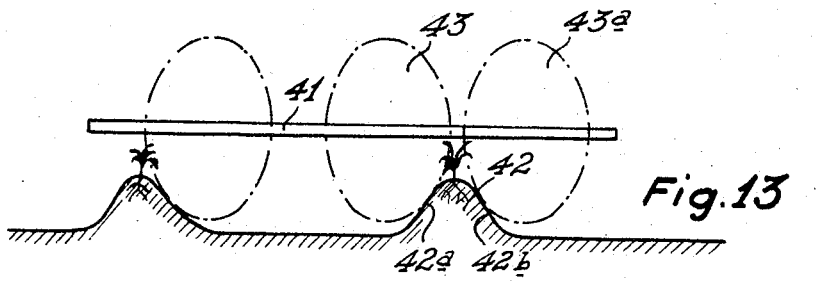
Figure 14:
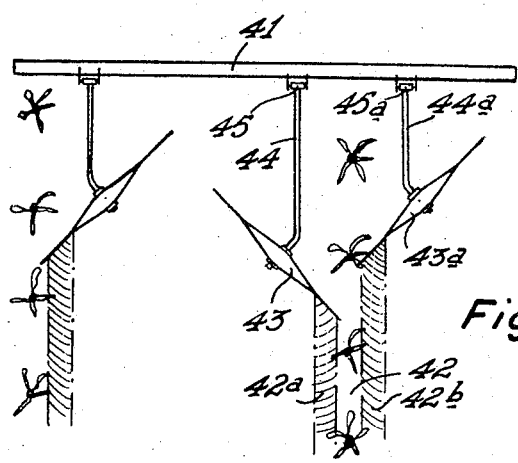
Figures 15A, 15B, 15C:
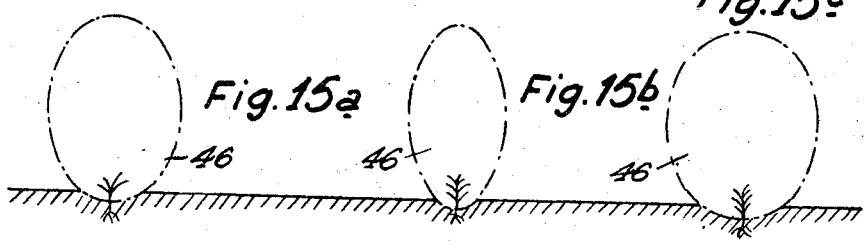
Figures 16A, 16B, 16C:
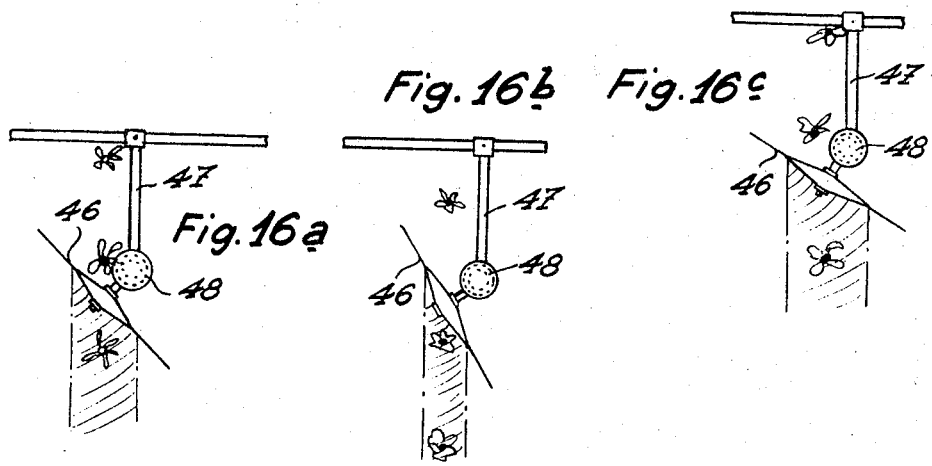
Figure 17:
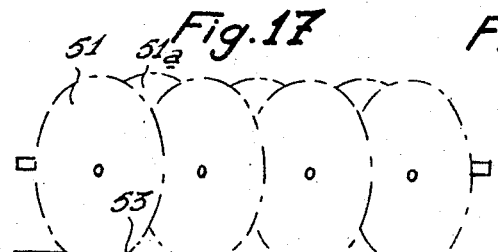
Figure 19:
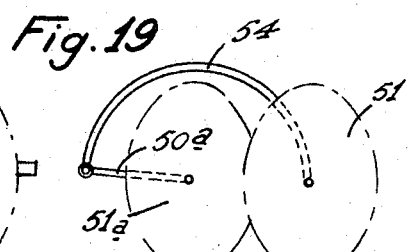
Figure 18:
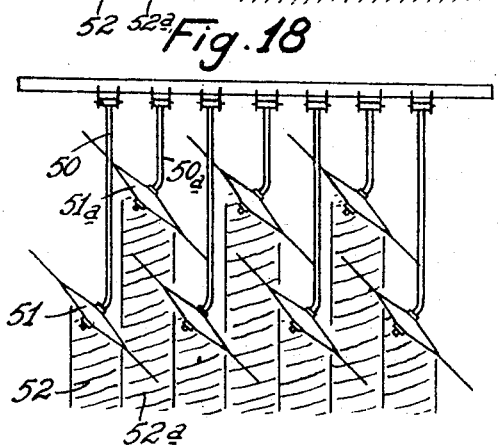
Figure 30:
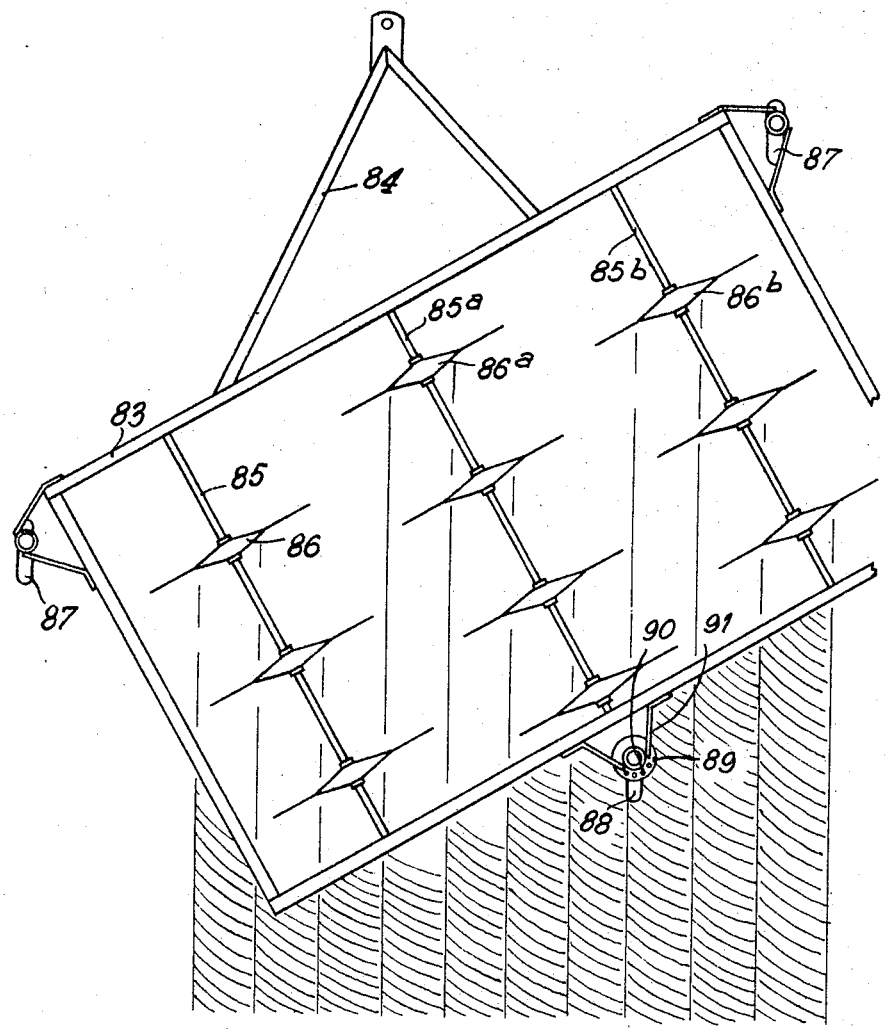
Figure 32:
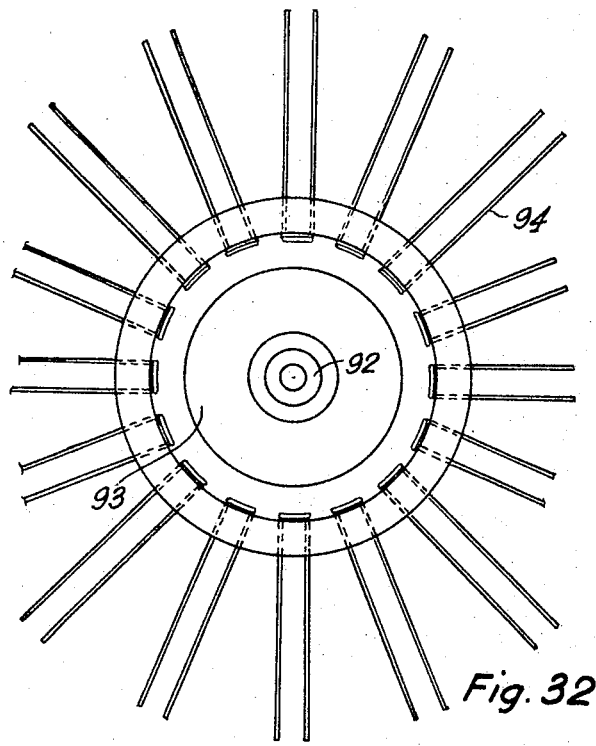
Figure 31:
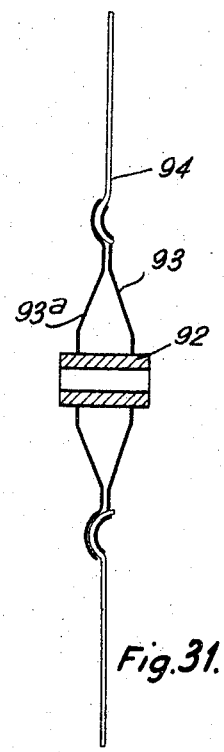

The invention will be more clearly understood from the following detailed description of some preferred embodiments thereof, as illustrated in the accompanying drawing in which:

FIGURE 1 is an elevational view showing a hoeing-cleaning machine constructed in accordance with the teachings of this invention, FIGURE 2 is a plan view showing the hoeing-cleaning machine illustrated in FIG. 1 coupled to a tractor, FIGURE 3 is a view similar to that of FIG. 2 showing a machine adapted to be drawn by an animal, FIGURE 4 is an elevational view showing the sounding-wheel of the machine illustrated in FIG. 3, FIG. 5 shows the mounting of a spring for compensating lateral thrust, FIGURE 6 is a lateral detail view on enlarged scale showing a disc-carrying crank, FIGURE 7 is a front view of a stop for a disc-carrying crank, FIGURE 8 is a diagrammatical view showing the automatic correction of the position of a disc under the control of its crank, FIGURE 9 is a plan view showing a further hoeing-cleaning machine, FIGURE 10 is an alternate embodiment of the machine shown in FIG. 9, FIGURE 11 is a plan view of a hoeing-cleaning machine according to this invention, which comprises a plurality of lateral co-extensive sections, FIGURE 12 is an elevational view of a disc provided with flexible tines and constructed in accordance with the teachings of the present invention, FIGURE 13 is a diagrammatical elevational view showing a hoeing-cleaning machine intended for ridge cultivation, FIGURE 14 is a plan view of the machine illustrated in FIG. 13, FIGURES 15a, 15b, 15c illustrate diagrammatically the manner in which the swivelling discs operate for hoeing and cleaning furrows, FIGURES 16a to 16c showing in plan view the corresponding portion of the machine, FIGURES 17 and 18 illustrate in elevational and plan views respectively a hoeing-cleaning machine adapted for use on soil having ridges or furrows of variable spacing, FIGURE 19 is a modified embodiment of the machine shown in FIGS. 17 and 18, FIGURES 20 and 21 illustrate another modified embodiment of the machine shown in FIGS. 17 and 18, FIGURES 22 and 23 illustrate a third alternative embodiment of the machine shown in FIGS. 17 and 18, FIGURES 24 to 29 are detail views showing various pressure-adjusting devices applicable to the machine of this invention, FIGURE 30 is a diagrammatical plan view showing a hoeing-cleaning machine intended for light-duty and rough hoeing work, FIGURES 31 and 32 are a radial section and a lateral view respectively of another form of embodiment of a disc provided with resilient tines according to this invention, FIGURES 33 to 38 illustrate various forms of crank-shaped disc-supporting members, FIGURE 39 is a lateral view showing another form of disc equipped with flexible deformable tines according to this invention, FIGURE 40 is a lateral view of the disc with flexible deformable tines which is illustrated in FIG. 39, FIGURE 41 illustrates on enlarged scale the section of FIG. 39 taken upon line XLI—XLI, FIGURE 42 is a detail view drawn on enlarged scale showing the mounting of the tines of the disc of FIG. 39, FIGURE 43 is a plan view of another embodiment of the hoeing-cleaning machine with several working planes illustrated in FIG. 30, FIGURE 44 is a section of FIG. 43 taken along line XLIV—XLIV, FIGURE 45 is a perspective view of a detail of the machine illustrated in FIGS. 43 and 44.

Figure 50:
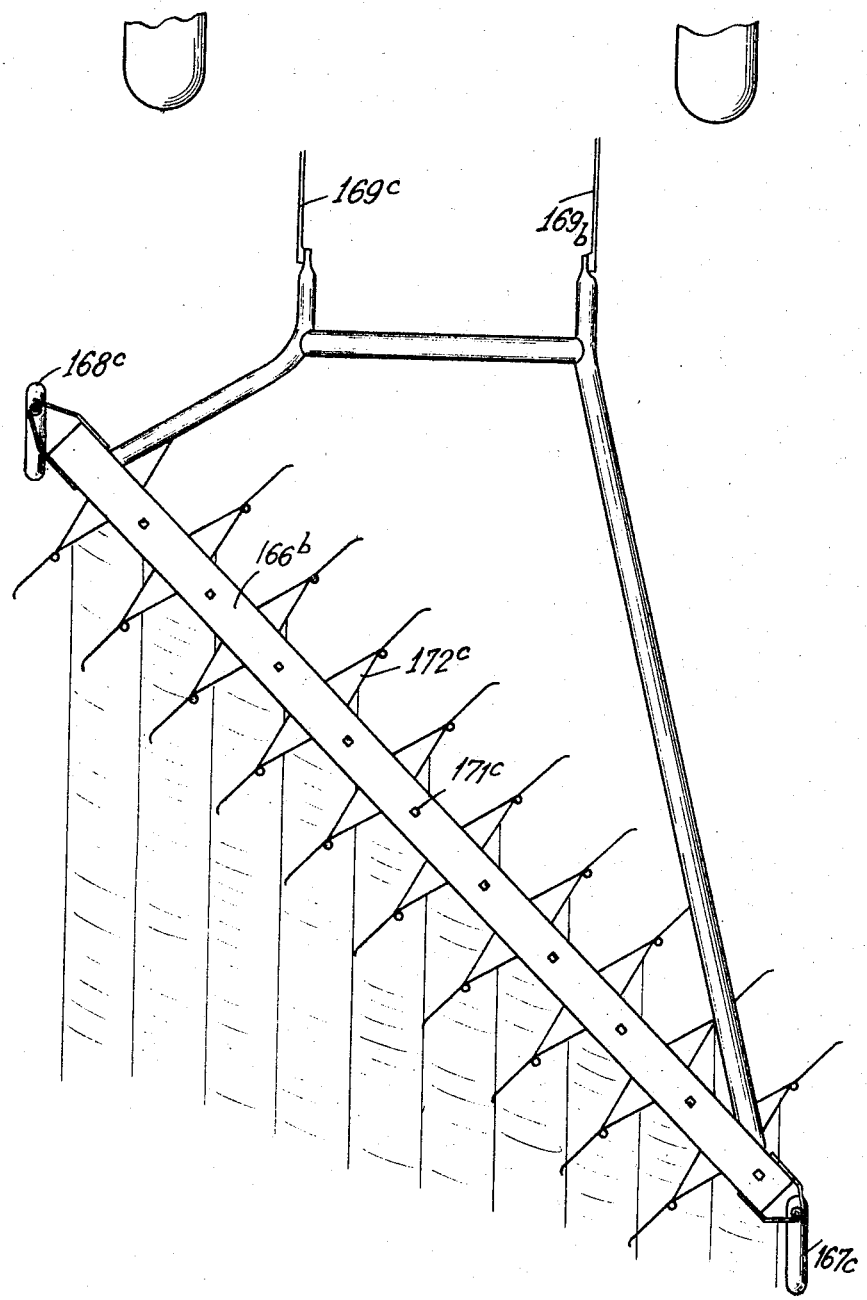

FIGURE 46 is a plan view of a hoeing-cleaning machine equipped with a beam acting as the frame and utilized for performing both rough and very light hoeing work, FIGURE 47 is an elevational view of a disc-carrying axle mounted on the machine illustrated in FIG. 46, said view being taken perpendicularly to the disc, FIGURE 48 is a partial plan view of a machine of the kind illustrated in FIG. 46, wherein the discs are associated with a common control device for modifying their obliquity with respect to the frame, FIGURE 49 is a view similar to that of FIG. 47 illustrating a disc-carrying axle for the machine illustrated in FIG. 48, and FIGURE 50 is a plan view of another embodiment of the machine illustrated in FIG. 46.

Referring firstly to the embodiment illustrated in FIGS. 1 and 2, the hoeing-cleaning machine according to the present invention comprises a frame consisting of a parallelogram of the parallel-motion type, comprising a lifting member 1 attached to the tractor tug arms 2, a pair of lateral pivoted links 3 and a rear cross-member 4, in which equidistant transverse holes are drilled. These holes are employed for mounting collars 5 having pivotally mounted therein crank-shaped supports 7 on which lightweight discs 8 provided with tines 9 are journalled for rotation in planes oriented obliquely with respect to the normal forward direction of motion of the machine. With this arrangement it is possible to adjust the lateral spacing of the discs so that the latter move coaxially relative to the rows of the plantation or crop. Moreover, the rear cross-member 4 carries a pair of ground engaging or sounding wheels 10 adjustable in the lateral direction to fit between two adjacent rows. These wheels are carried by a support 11 having a vertical spindle 12 threaded to permit the adjustment of the depth of operation of the discs 8 so that the latter are driven as the machine progresses by engaging the soil with their tines 9 which penetrate slightly into the ground without touching the plants 13 to be protected.

In the embodiment illustrated, the width of the strip of soil worked by each disc is indicated by the chord $ab$ of the projection of the disc set at 45 degrees and the depth of operation is designated by the dimension $f$ or dip of this cord. The disc tines 9 effect curvilinear transverse displacement with respect to the axis of the rows of plants 13, as shown in the form of series of oblique curvilinear lines in the different figures of the drawings.

To provide for the lateral correction required either by the seeding spacing or by a difference between the traction axis and the plant row alignments, a lever 14 is attached on the pivot pin 15 of the parallelogram and operated by an assistant whereby the cross-member 4 may be constantly restored to its proper position. On the other hand, as illustrated in FIG. 5, a compensator spring 16 has its ends attached to the cross-members 1 and 4 for counteracting the lateral thrust produced by the action of the discs tending to move the assembly from the left to the right, thereby avoiding tiring the assistant.

As shown in FIG. 6, the cranked spindles 7 are provided with a pair of non-parallel journals 17, 18, a cam shaped stop 19 being associated with the journal 18 to limit the depth of penetration of the associated disc by engagement with the bearing-forming collar 5. With this arrangement the cleaning disc 8 may oscillate in a radial plane resulting from the angular difference between the two journal portions of the cranked spindle and from the angle of orientation of the bearing 5, so as to cause the resistance exerted on the disc to urge the same against the depth-controlling stop, thereby keeping the disc to a constant level as set by means of the sounding-wheels. This downward pressure resulting from the tendency to lift is illustrated in chain-dotted lines in FIG. 8.

FIG. 3 shows a hoeing-cleaning machine of the type illustrated in FIG. 2, but adapted to be drawn by an animal. The same parts are designated by the same reference numerals followed by the letter $a$. This hoeing-cleaning machine differs from the tractor-drawn machine in that the front cross-member 1$a$ of the frame is rigidly fixed to shafts 20 and carries the sounding-wheels 21, the discs 8$a$ being carried by the rear cross-member 4$a$. Each sounding-wheel 21 has a fixed direction on the support 22 having a vertical spindle fastened through a plate 23 with a nut 24 engaged by a threaded shaft portion 25 of a crank 26 to permit the vertical adjustment of the wheel, as shown. The sounding-wheels will thus insure the lateral guiding of the assembly.

The embodiment illustrated in FIG. 9 consists of a hoeing-cleaning machine derived from the hoeing-cleaning machine illustrated in FIG. 2. The same parts are designated by the same reference numerals followed by the letter $b$. This machine is provided, in addition to the parts already shown in FIG. 2, with a series of hoeing elements 27 secured on the transverse holes of the cross-member 4$b$. This makes it possible to hoe the inter-rows at the same time as the rows proper are being hoed and cleaned. This double and simultaneous operation is illustrated in FIGS. 9 to 11 by a series of curvilinear oblique lines indicating the hoeing-cleaning operation effected by the discs 8$b$, and by a series of transverse lines indicating the hoeing effected by the hoeing elements 27.

In the embodiment shown in FIG. 10, the parallelogram comprises a front base consisting of a cross-member 1$c$ and a rear base consisting of a pair of parallel cross-members 28, 29. The cross-member 28 carries the hoeing elements 27$c$ and the cross-member 29 carries the cleaning discs 8$c$. An alternate embodiment may be provided wherein both cross-members 28, 29 carry different tools, such as discs alternating with hoeing elements.

If it is desired to treat a considerable crop width to insure a more efficient correction, the tool-carrying cross-member may be divided into a plurality of sections 30, 31 as shown in FIG. 11, each lateral section 31 having its proper sounding-wheel 32 and being connected through hinge means 33 to the central element 30.

Preferably, each disc consists of a wheel 34 having a rigid rim 35 carrying peripheral flexible tines 36 for example of spring steel, the number of tines varying with the desired frequency of passage and pitch. As shown in FIG. 1, the disc may also consist of a wheel 37 having resilient spokes, for example of spring steel, which project from the rim 38 to constitute the tines 9 themselves.

The hoeing-cleaning machine illustrated in FIGS. 13 and 14 is particularly suitable for row-crops in which a field-rafting or ridging is required. In this case, the traction member 41 carries a pair of discs 43, 43$a$ having flexible tines and disposed on either side of a corresponding ridge 42; thus, the disc 43 is inclined to the left and the disc 43$a$ to the right. As these discs carried by crank-shaped supports 44 and 44$a$ operate in opposite directions on each slope 42$a$, 42$b$ of the ridge 42, when the machine progresses in the direction of the arrow $f$, the conjugate actions of these two discs 43, 43$a$ will be tangent to the plantation and the ridge will be reinforced if need be, the direction of rotation of the discs causing the earth to be loosened and somewhat dumped over the plants.

When the row-crop is of the furrow or drain type, care must be taken not to damage the soil contour and to work in the axial direction of the row and in the bottom of the furrow or drain, without deforming the latter, and as illustrated in FIGS. 15$a$, to 15$c$ and 16$a$ to 16$c$ the projecion of the flexible-tine carrying disc 46 may be suitably adjusted in the plane of motion of the machine by mounting this disc on a supporting crank 47 having means 48 for adjusting the angular setting of its journal. With this modified arrangement of the disc projection for passing from a relatively narrow furrow (FIG. 16$b$) to a relatively wide furrow (FIG. 16$c$), in combination with the use of discs of different diameters, it is possible to treat any types and sizes of hollow contours of plantations.

The examples shown in FIGS. 17 to 23 refer to hoeing-cleaning machines of the disc type, adapted for treating row-crops, when the soil contour has a variable or fixed corrugation pitch, for example a soil having alternate furrows and ridges.

In the embodiment shown in FIGS. 17 and 18, the traction member 49 of the hoeing-cleaning machine carries a plurality of crank-shaped supports 50, 50a of different lengths, having mounted on their rear ends corresponding overlapping discs 51, 51a provided with flexible tines. Each pair of discs 51, 51a effect simultaneously the hoeing-cleaning of two adjacent furrows 52, 52a as well as of the ridge 53 situated therebetween. The crank-shaped supports 50a on which the rearmost discs are mounted may advantageously be of bridge shape as shown at 54, FIG. 19, so as to clear the first row of discs in case the latter were too close to permit the passage of straight supports.

Figure 20:
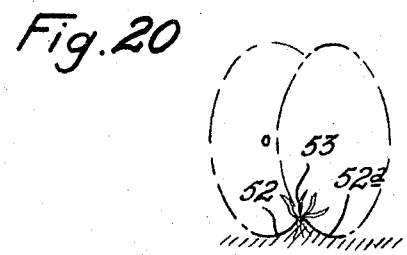
Figure 21:
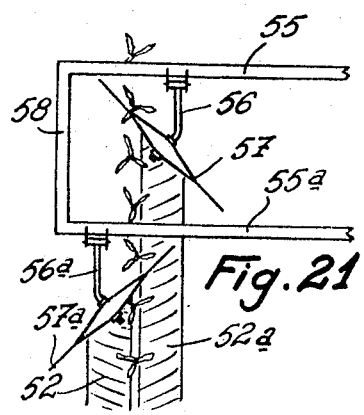

In the embodiment shown in FIGS. 20 and 21, the hoeing-cleaning machine comprises a pair of parallel traction members 55, 55a, each carrying crank-shaped supports 56, 56a, on which discs 57, 57a overlapping one another and having different orientation are mounted to permit the simultaneous hoeing and cleaning of two adjacent furrows 52, 52a together with the intermediate ridge 53. The traction members 55, 55a are rigidly interconnected through side bars 58, and the spacing between these discs 57 and 57a is adjustable in each series.

Figure 23:
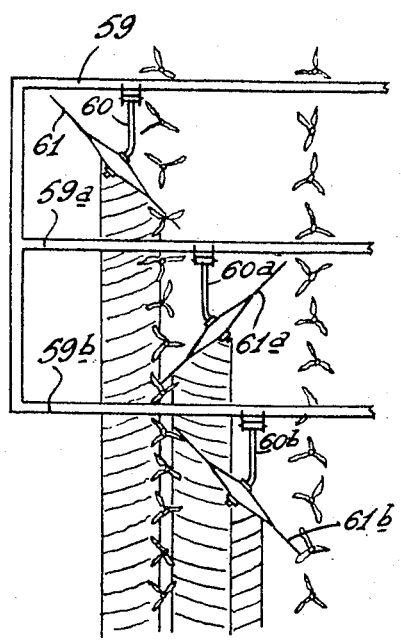
Figure 22:
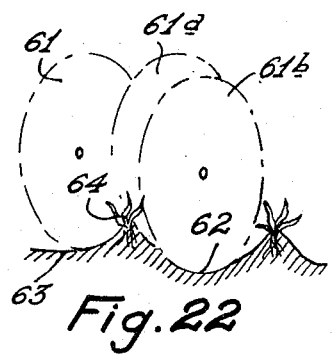

In the embodiment illustrated in FIGS. 22 and 23, the hoeing-cleaning machine comprises three traction members 59, 59a, 59b, rigidly interconnected and supporting crank-shaped supports 60, 60a and 60b equipped with discs 61, 61a, 61b having different successive orientations, as shown. With this machine it is possible to hoe and clean simultaneously a deep furrow 62, an adjacent shallow furrow 63 and the ridge 64 therebetween, both discs 61a and 61b acting on the ridge slope ending in the deeper furrow 62 with different pressures on each portion of the contour worked by these discs.

FIGS. 24 to 29 illustrate various means which may be employed for adjusting the pressure exerted on each disc according to the nature of the ground or to the desired flexibility of operation.

This variation is obtained in the case of FIG. 24, by providing the supporting crank 65 (otherwise slidably adjustable in its axial direction and pivotally mounted at 66) with a rod 67 carried by its sliding portion and having fastened thereon a weight 68, the position of which may be adjusted on this rod 67. Thus, the weight of the complete pivoted assembly may be adjusted to vary the pressure exerted by the relevant disc on the ground. In the case of FIG. 25 the crank-shaped support 69 pivotally mounted at 70 is adjustable telescopically and by altering the length of this support it is possible to adjust the weight of the assembly bearing on the soil. The modification of this pressure may be obtained, as shown in FIGS. 26 and 27, with the assistance of a sounding-wheel 71 adjustable in any suitable and known manner, which is carried by the telescopic support 72 pivotally mounted at 73. Thus, a constant depth of operation for the tines and a sufficient pressure on the soil are provided since the weight of the assembly is greater than the resistance to soil penetration.

In the embodiment illustrated in FIG. 28, a compensator spring 74 has one end anchored to a member 75 rigid with the frame of the machine and its other end secured on the telescopic crank-shaped support 76 so that by adjusting this support it is possible to alter, as desired, the pressure exerted by the disc on the ground. The spring 74 may be a compression or a tension spring. As shown in FIG. 29, it is also possible to modify the pressure exerted on the ground with the assistance of a lever 77 pivoted at 78 on the frame and connected through a link 79 to the telescopic cranked support 80, this lever 77 being associated with a toothed segment 81. Instead of providing a separate adjustment for each lever, as shown in FIG. 29, a single lever may be actuated for adjusting a complete series of discs. The pressure adjustment may also be effected by means of adjustable cams or stops acting separately under each cranked support, as shown at 82 in FIGS. 25 and 26.

FIG. 30 shows an agricultural machine constructed in accordance with the teachings of this invention and adapted to accomplished rough and very light hoeing operations. This machine comprises a rigid frame 83 having a traction device 84 and supporting three axles 85, 85a, 85b, on which series of discs 86, 86a, 86b, provided with flexible tines, are mounted. This frame 83 has front sounding-wheels 87 mounted on its front cross-member and a rear sounding-wheel 88 mounted on its rear cross-member for limiting the action of the machine in the vertical direction. The sounding-wheel 88 is provided with a segment 89 in which a plurality of holes 90 are drilled, whereby this wheel may be set in the desired angular position with respect to its supporting axle 91 and act as a steering wheel. The different settings provide various angles of traction according to the desired fineness of the combing operation. The assembly rests with its inherent weight on the ground and the discs rotating freely on their axles are pulled downwardly so that the machine operates like a rotary harrow to sweep an area substantially as wide as the frame diagonal which lies somewhat normally to the direction of motion of the machine.

The embodiments illustrated in FIGS. 43 to 50 relate to hoeing-cleaning machines for rough hoeing work of the type specified hereinabove and more particularly usable when the ground to be worked is not levelled.

In the embodiment illustrated in FIGS. 43 to 45, the hoeing-cleaning machine comprises a rigid frame 150 formed by tubular elements and provided with a three-point attachment device 151, 152. Said frame carries three oblique cross-bars 153, 154 and 155. The thusly constituted assembly is supported by sounding-wheels 156, 157 and 158 which are vertically adjustable for determining the height of said frame with respect to the ground.

On the frame 150 and the cross-bars 153 to 155 are mounted series of discs 160 provided with flexible tines by means of individual axles 161 pivotally supported by flanges 162 carried by said frame and said cross-bars. Each axle is provided at its end with a milled recess 163 on which bears a spring 164 the other end of which bears against a transverse member 165 carried by the flanges 162 mounted on the following tubular element. The pressure exerted by each spring may be adjusted for the corresponding disc independently from the pressure exerted on the other discs by means of any known adjustment device, in order to insure a working depth in accordance with the contour of the soil to be worked. The frame 150 could be devoid of sounding-wheels.

In the embodiment illustrated in FIGS. 46 and 47, the frame consists of a single beam 166 supported by vertically adjustable sounding-wheels 167 and 168 and provided with a traction device 169. Through said beam 166 are mounted at suitable intervals axles integral with vertical spindles 170. The upper portion 171 of each spindle has a square cross-section the position of which with respect to the beam 166 is determined with a view to give a suitable orientation to the disc 172 provided with flexible tines and rotatably mounted on the axle 173. The vertical spindles 170 may vertically slide through the beam 166, their vertical position being adjusted by means of pins entering holes formed in their portions 171. These spindles are further associated with springs 175 adapted to generate the pressure exerted on the discs. Said pressure may be adjusted by modifying the position of the bearing washer 176 on the vertical spindle 170 by means of pins disposed through holes 177 formed on said spindle.

The embodiment illustrated in FIGS. 48 and 49 differs only from that shown in FIGS. 46 and 47 by the fact that each vertical spindle has a circular cross-section for its portion sliding through the beam 166a and ends with a square portion 171a on which is mounted a lever 178. The levers 178 are interconnected by link-arms 179 and their assembly is connected by a link-arm 180 to a control lever 181 cooperating with a toothed sector mounted on the beam 166a. When acting on said lever 181, it is thus possible to modify simultaneously the orientation of the discs 172a with respect to the pulling direction, which modifies the combing pitch.

The hoeing-cleaning machine illustrated in FIG. 50 differs from that shown in FIG. 46 only by the fact that the frame is formed by a beam 166b having an oblique direction with respect to the pulling direction, the elements similar to those of said FIG. 46 having the same reference numerals followed by the letter b.

The adjustable springs utilized for exerting a variable pressure on the discs of the machines illustrated in FIGS. 43 to 50 could be replaced by any device adapted to vary the pressure exerted on the discs, as those illustrated in FIGS. 24 to 29.

FIGS. 31 and 32 of the drawings illustrate one form of a disc with flexible tines of the type adapted for use with a hoeing-cleaning machine according to this invention. This disc comprises a hub 92 having secured thereon a pair of circular flanges 93, 93a, and U-shaped flexible tines 94 having their prongs located between the flanges 93 and 93a, and the portion connecting these prongs positioned externally of the flange 93 as shown. The number of flexible tines may vary according to the peripheral length of the disc rim, and these tines may be either single or grouped by pairs or more, as illustrated in FIGS. 31 and 32, to facilitate their fixation.

Figure 33:
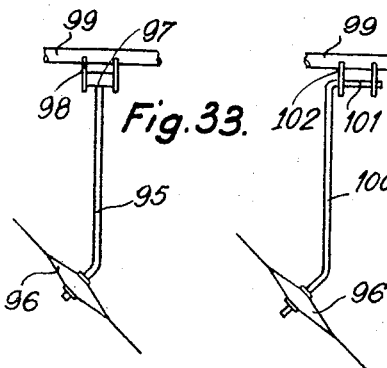
Figure 34:
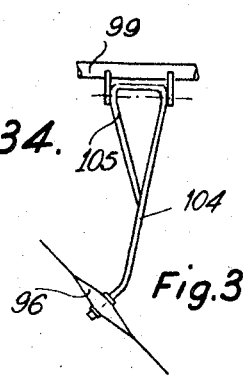
Figure 35:
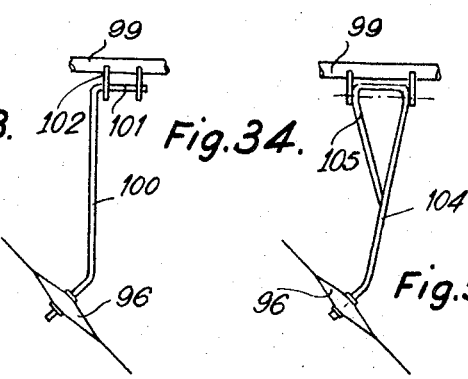
Figure 36:
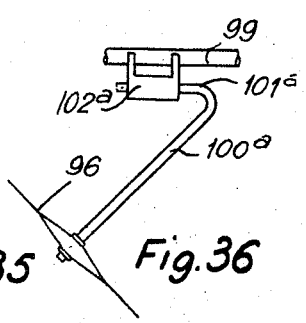
Figure 37:
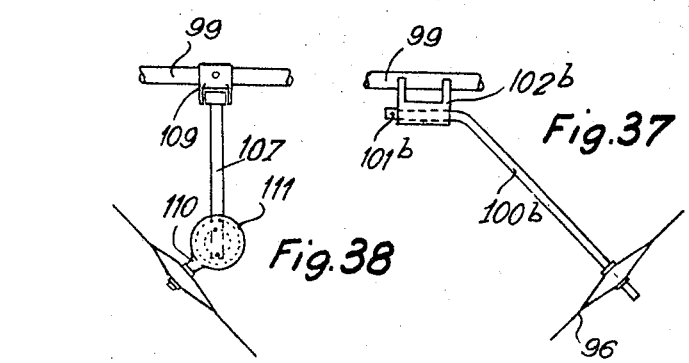

FIGS. 33 to 37 illustrate various forms of embodiment of crank-shaped supports designed to carry the discs 96. In FIG. 33, the support comprises an arm 95 carrying at one end the disc 96 provided with flexible tines and at the other end a socket 97 journalled on a supporting strap 98 adjustably displaceable along the traction member 99. In the embodiment of FIG. 34, the bar 100 of the cranked support carries at one end the disc 96 and has its other end 101 bent at right angles and adapted to be pivotally mounted on a support 102 also adjustably displaceable along the traction member 99. In FIGS. 36 and 37, similar arrangements are shown wherein the bars 100a and 100b are set at an angle with respect to the traction member 99 and provided with a portion 101a bent to an acute angle or 101b bent to an obtuse angle, adapted to be pivotally mounted in a support 102a or 102b respectively, adjustably displaceable along the traction member 99.

In the embodiment of FIG. 35, the cranked support consists of a rod 104 carrying at its rear end a disc 96 and having its other or front end 105 bent to a stirrup or delta shape and hingedly or pivotally mounted through its transverse element on a support 186 adjustably displaceable along the traction member 99. The cranked supports illustrated in FIGS. 33 to 37 are adapted for use on any hoeing-cleaning machines described with reference to FIGS. 1 to 5, 9 to 11, 13, 14 and 17 to 23.

Figure 38:
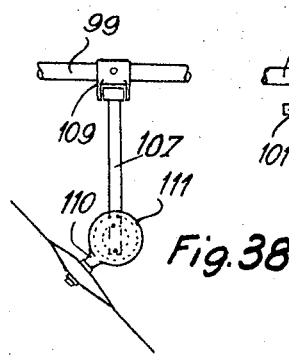

In view of enabling the machine to hoe and clean plantations seeded in furrows, according to the examples shown in FIGS. 15a to 15c and 16a to 16c, the cranked disc-support illustrated in FIG. 38 consists of a rigid member 107 journalled through a socket 108 on a support 109 adjustably displaceable along a traction bar 99. The hub of disc 96 is carried by an axle member 110 formed integrally with a circular member 111 in which one or more circular series of holes are drilled. The circular member 111 may be fastened to the rigid member 107 by inserting one or more pins in these holes and also in registering holes drilled in the member 107. With this arrangement it is possible to modify at will the inclination of the support 110 and therefore of the disc 96 with respect to the direction of motion of the hoeing-cleaning machine.

In the embodiment illustrated in FIGS. 39 to 42 the disc equipped with deformable flexible tines comprises a pair of large-diameter flanges 117 and 118 of which the former is welded on the hub 119, the other flange 118 being clamped thereon by means of a notched nut 120. The flange 118 has formed in its peripheral region a series of substantially radial apertures 125. Pairs of tines 126, 127 consisting of U-bent steel wires are clamped between the flanges 117, 118. The prongs of the U are each formed near their inner ends with cranked portions 129, 130 projecting through the flange 118 across a relevant pair of adjacent apertures 125. Moreover, these prongs are wound to form a complete coil turn or spiral 131 located near the peripheral outer edges of the flanges 117, 118. Steel wire elements 132, 133 having the shape of circular arcs are inserted between the cranked portions 129, 130 and the flange 118. This makes it possible to remove the tines fastened to the flange 118 by displacing one of the wire elements 132, 133 without it being necessary to remove all the tines from the disc.

It will be readily understood by anybody conversant with the art that many modifications and alterations may be brought to the embodiments shown and described herein without departing from the spirit and scope of the invention as set forth in the appended claim.

What I claim is:

Weeding apparatus comprising a horizontal cross-member, at least one support aligned with the intended direction of travel in trailing relation to said cross-member, means pivotally connecting said support to said cross-member for free hinged movement about a horizontal axis adjacent the cross-member, an adjustable stop operatively associated with said support to limit downward movement of the latter, a tined wheel, means supporting the tined wheel for rotation on a horizontal axis and connecting the tined wheel to said support for hinged adjustment about a vertical axis whereby to adjust the angle of the tined wheel relative to said direction and a ground engaging wheel coupled to and supporting said support, said tine wheel comprising facing discs, a plurality of radial tine elements supported between the discs, each of said tine elements comprising a U-shaped portion between the discs, the U-shaped portion including cranked portions extending through one of the discs and forming loops outside the same, a locking element extending through the loops to prevent removal of the tine elements, co-axial coils on the U-shaped portion, and tines extending outwardly from said coils.

References Cited by the Examiner

UNITED STATES PATENTS

| | | | |
|---|---|---|---|
| 231,582 | 8/1880 | Ives | 172—153 |
| 354,557 | 12/1886 | LaDow | 172—707 X |
| 1,244,982 | 10/1917 | Horst | 172—543 |
| 1,642,261 | 9/1927 | Patterson | 172—556 |
| 2,588,599 | 3/1952 | Winter. | |
| 2,657,620 | 11/1953 | Meeks | 172—549 X |
| 2,712,723 | 7/1955 | Ryan | 56—377 X |
| 2,758,531 | 8/1956 | Siems | 172—193 X |
| 2,861,412 | 11/1958 | van der Lely et al. | 56—370 X |
| 2,892,299 | 6/1959 | van der Lely et al. | 56—370 |

FOREIGN PATENTS 877,890  10/1941  France.

ANTONIO F. GUIDA, Primary Examiner.

T. GRAHAM CRAVER, J. R. OAKS, Examiners.